United States Patent [19]

Suzuki et al.

[11] Patent Number: 4,986,509

[45] Date of Patent: Jan. 22, 1991

[54] SEAT LIFTER

[75] Inventors: Takami Suzuki; Isamu Chinomi; Yuji Tanaka; Isao Kuwabara, all of Kanagawa, Japan

[73] Assignee: Ikeda Bussan Co., Ltd., Ayase, Japan

[21] Appl. No.: 369,688

[22] Filed: Jun. 21, 1989

[30] Foreign Application Priority Data

Sep. 29, 1988 [JP] Japan .................. 63-127826[U]

[51] Int. Cl.⁵ ............................................. F16M 11/12
[52] U.S. Cl. ................................... 248/396; 248/421; 248/422
[58] Field of Search .............. 248/371, 394, 398, 396, 248/157, 421, 422, 423; 297/330

[56] References Cited

U.S. PATENT DOCUMENTS

| 4,720,070 | 1/1988 | Nishino | 248/394 |
| 4,787,594 | 11/1988 | Ikegaya | 248/422 |

FOREIGN PATENT DOCUMENTS

| 3525374 | 1/1986 | Fed. Rep. of Germany | 297/328 |
| 89429 | 5/1983 | Japan | 297/330 |
| 200040 | 9/1986 | Japan | 248/421 |
| 1273890 | 5/1972 | United Kingdom . | |
| 1366189 | 9/1974 | United Kingdom . | |
| 2054731 | 2/1981 | United Kingdom . | |
| 2081082 | 2/1982 | United Kingdom | 297/330 |

Primary Examiner—Ramon O. Ramirez
Assistant Examiner—Robert A. Olson
Attorney, Agent, or Firm—Foley & Lardner, Schwartz, Jeffery, Schwaab, Mack, Blumenthal & Evans

[57] ABSTRACT

A seat lifter for a vehicular seat comprises spaced side base members; and front and rear lift mechanisms which are mounted on front and rear portions of the side base members for adjusting the heights of front and rear portions of a seat cushion respectively. Each lift mechanism comprises a pivot shaft extending across the side base members, brackets secured to the pivot shaft to rotate therewith, arm members pivotally connected to the brackets and connected to the seat cushion, a sector gear pivotally connected to one of the side base members and pivotally moved together with the pivot shaft, a pinion meshed with the sector gear, and a handling knob mounted on the side base member and having the pinion connected thereto.

15 Claims, 2 Drawing Sheets

SEAT LIFTER

BACKGROUND OF THE INVENTION

1. Field of the Invention

The present invention relates in general to vehicular seat position adjusters, and more particularly, to vehicular seat lifters which lift and lower a vehicular seat to a desired height position for providing a seat occupant with a comfortable sitting posture.

2. Description of the Prior Art

In order to clarify the task of the present invention, a conventional vehicular seat lifter will be described with reference to FIG. 4 of the accompanying drawings.

The seat lifter is designated by numeral 3a, which mounts thereon a seat assembly. The seat assembly comprises a seat cushion 2 mounted on the seat lifter and a seatback (no numeral) mounted on a rear end of the seat cushion 2.

The seat lifter 3a comprises a rectangular base member 4 mounted on a vehicle floor 1. Front and rear pivot shafts 8a and 8b extend across opposed side wall portions of the base member 4. Each pivot shaft 8a or 8b has left and right crank levers 5a and 5b secured thereto. Each crank lever 5a or 5b includes a downwardly extending arm and a rearwardly extending arm. The left crank levers 5a and 5a on the front and rear pivot shafts 8a and 8b are pivotally connected at their downwardly extending arms to front and rear ends of a left link 9a, and similar to this, the right crank levers 5b and 5b on the front and rear pivot shafts 8a and 8b are pivotally connected to a right link 9b. The rearwardly extending arms of the four crank levers 5a and 5b each have a bracket 6a or 6b pivotally connected thereto. These four brackets 6a are bolted at their bent ends to the seat cushion 2. Denoted by numeral 7 is a bolt opening of each bracket 6a or 6b, through which a bolt (not shown) for connecting the bracket and the seat cushion 2 passes.

When the pivot shafts 8a and 8b are rotated about their axes by a drive means (not shown), the rearwardly extending arms of the crank levers 5a and 5b and thus the brackets 6a and 6b pivotally connected to the arms are raised or lowered relative to the pivot shafts 8a and 8b. Thus, the seat cushion 2 on the brackets 6a and 6b is moved upward or downward to a desired height position.

However, due to its inherent construction, the seat lifter has the following drawbacks.

That is, the work for assembling or mounting the seat assembly to the brackets 6a and 6b is difficult or at least troublesome. In fact, positioning of each bracket 6a or 6b (more specifically, positioning of the bolt opening 7 formed therein) relative to given portions of the seat cushion 2 is very difficult because the brackets are liable to swing unstably before they are bolted to the seat cushion 2. If the mounting of the seat cushion 2 to the brackets 6a and 6b is carried out with a poor position matching therebetween, smooth operation of the seat lifter 3a is not expected. If a special jig is used for achieving the position matching, production cost of the seat lifter is increased.

SUMMARY OF THE INVENTION

It is therefore an object of the present invention to provide a vehicular seat lifter which is free of the above-mentioned drawbacks.

According to the present invention, there is provided a vehicular seat lifter which is simple in construction, easy to manufacture and effective in operation.

According to the present invention, there is provided a seat lifter which comprises spaced side base members, and front and rear lift mechanisms which are mounted on front and rear portions of the side base members for adjusting the heights of front and rear portions of a seat cushion respectively, wherein each lift mechanism comprises a pivot shaft extending across the spaced side base members, brackets secured to the pivot shaft to rotate therewith, arm members pivotally connected to the brackets and connected to the seat cushion, a sector gear pivotally connected to one of the side base members and pivotally moved together with the pivot shaft, a pinion meshed with the sector gear and a handling knob mounted on the side base member and having the pinion connected thereto.

BRIEF DESCRIPTION OF THE DRAWINGS

Other objects and advantages of the present invention will become apparent from the following description taken in conjunction with the accompanying drawings, in which.

DETAILED DESCRIPTION OF THE INVENTION

In the following, the terms "front", "rear", "left", "right", "forward", "rearward" and the like are to be understood with respect to a vehicle on which a seat lifter 20 of the present invention is mounted.

Figure 1:
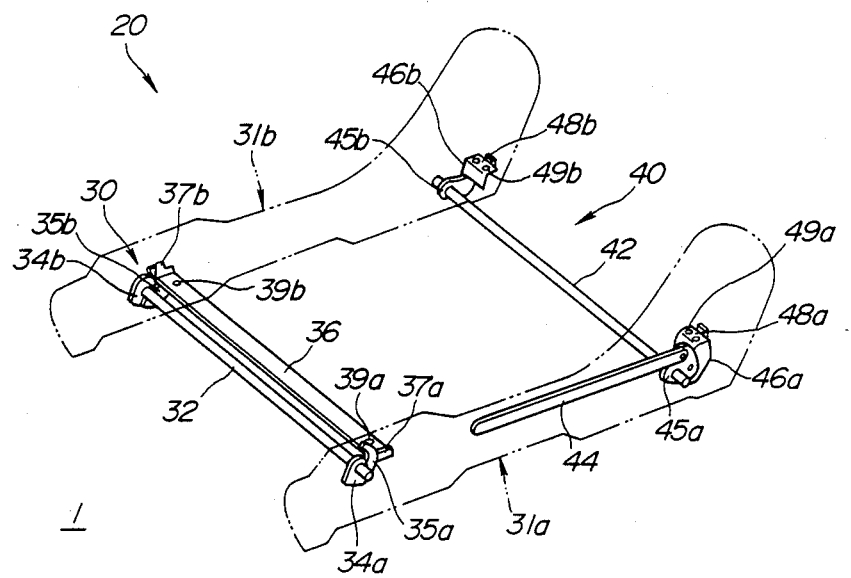
FIG. 1 is a perspective view of a seat lifter of the present invention.
Figure 2:
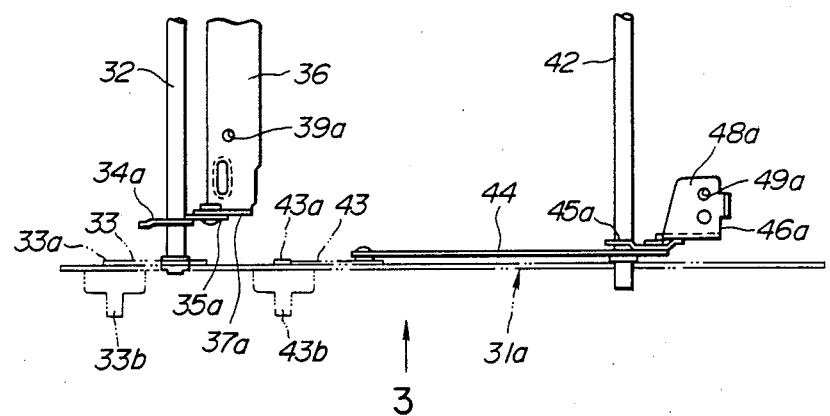
FIG. 2 plan view of a part of the seat lifter of the invention.
Figure 3:
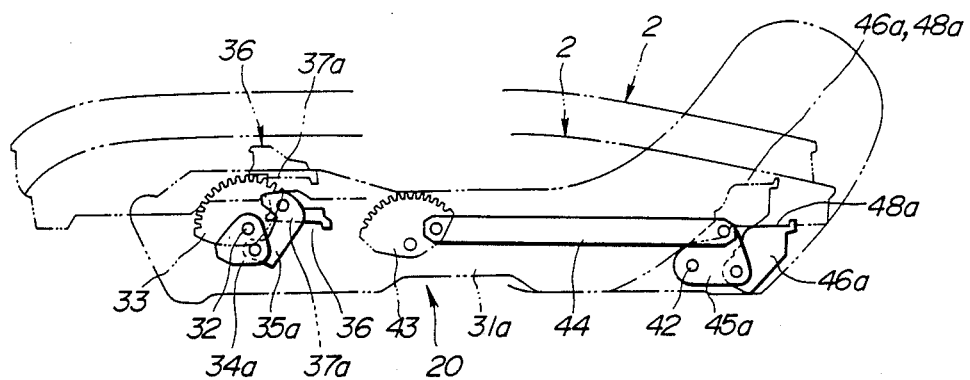
FIG. 3 is a side view of the seat lifter, which is taken from the direction of the arrow "3" of FIG. 2.

Referring to FIGS. 1 to 3, there is shown a vehicular seat lifter 20 constructed in accordance with the present invention.

As is seen from FIG. 1, the seat lifter 20 is mounted on a vehicle floor 1. As is seen from FIG. 3, a seat cushion 2 is mounted on the seat lifter 20 for height adjustment relative to the vehicle floor 1.

The seat lifter 20 comprises generally front and rear lift mechanisms 30 and 40 which are arranged on left and right base members 31a and 31b mounted on the vehicle floor 1. As will become apparent as the description proceeds, the front and rear lift mechanisms 30 and 40 adjust the heights of front and rear portions of the seat cushion 2, respectively.

The front lift mechanism 30 comprises a pivot shaft 32 which extends across front portions of the left and right base members 31a and 31b. The pivot shaft 32 is rotatable about its axis relative to the base members 31a and 31b and biased by a spring (not shown) in a counterclockwise direction in FIG. 3.

As is seen from FIGS. 2 and 3, the pivot shaft 32 has a sector gear 33 secured to the left end thereof. As is seen from FIG. 2, operatively engaged with the sector gear is a pinion 33a which is connected through a known brake lock mechanism to a handling knob 33b mounted to the left base member 31a. The brake lock mechanism is installed in the handling knob 33b.

Left and right brackets 34a and 34b are secured to left and right end portions of the pivot shaft 32 to rotate therewith. Each bracket 34a or 34b has an arm member 35a or 35b pivotally connected thereto. An elongate member 36 is pivotally connected at its bent ends 37a and 37b to leading ends of the arm members 35a and 35b. The elongate member 36 is shaped substantially flat and formed at given portions with bolt openings 39a and 39b. Preferably, the bolt openings 39a and 39b are made at the same time by using a piercing machine for achieving a positional precision therebetween. As will be described in detail hereinafter, the elongate member 36 is secured to a bottom portion of the seat cushion 2 by bolts which pass through the bolt openings 39a and 39b.

It is thus to be noted that when the handling knob 33b is turned, the pivot shaft 32 is turned in a certain direction thereby raising or lowering the elongate member 36 and thus the front portion of the seat cushion 2 is raised or lowered.

The rear lift mechanism 40 comprises a pivot shaft 42 which extends across rear portions of the left and right base members 31a and 31b. The pivot shaft 42 is rotatable about its axis relative to the base members 31a and 31b and biased by a spring (not shown) in counterclockwise direction in FIG. 3.

As is seen from FIG. 1, the pivot shaft 42 has brackets 45a and 45b secured to left and right portions thereof. As is seen from FIG. 3, the left bracket 45a has an upper portion to which a rear end of a link 44 is pivotally connected. A front end of the link 44 is pivotally connected to a sector gear 43 which is pivotally connected to the left base member 31a. As is seen from FIG. 2, meshed with the sector gear 43 is a pinion 43a which is connected through a known brake lock mechanism to a handling knob 43b mounted to the left base member 31a. The brake lock mechanism is installed in the handling knob 43b.

Each bracket 45a or 45b has an arm member 46a or 46b pivotally connected thereto. The arm member 46a or 46b has an upper flat portion 48a or 48b with a bolt opening 49a or 49b. The arm members 46a and 46b are secured to the bottom portion of the seat cushion 2 by bolts which pass through the bolt openings 49a and 49b. If desired, an elongate member corresponding to the afore-mentioned elongate member 36 may be pivotally connected to the arm members 46a and 46b.

In the following, the steps for assembling the seat cushion 2 to the seat lifter 20 will be described.

Figure 4:
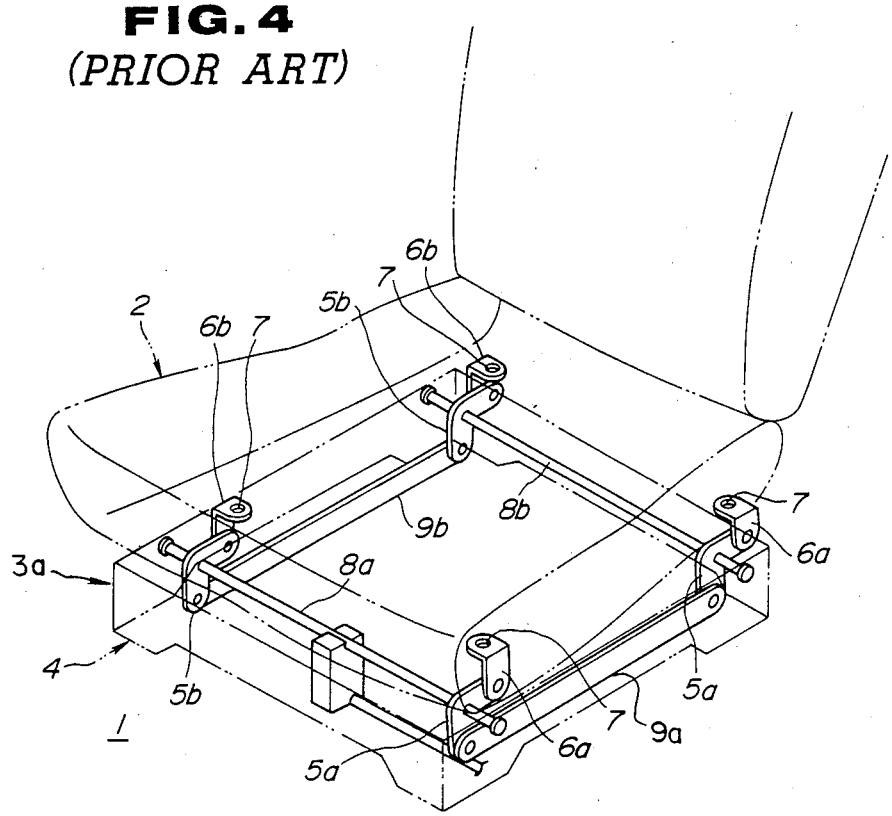
FIG. 4 is a perspective view of a conventional seat lifter.

First, the seat cushion 2 shown in FIG. 4 is put on the elongate member 36 of the front lift mechanism 30 and moved to such a position that one of the bolt openings 39a and 39b of the elongate member 36 mates with its corresponding bolt opening of the seat cushion 2. Then, a bolt is passed through the mated bolt opening and loosely fastened. Then, the seat cushion 2 is turned about the loosely fastened bolt to such a position that the other of the bolt openings 39a and 39b mates with its corresponding bolt opening of the seat cushion and another bolt is passed through the mated bolt openings and loosely fastened. It is to be noted that this position matching is easily achieved because the bolt openings 39a and 39b are both defined in a common member, viz., the elongate member 36.

Then, the arm members 46a and 46b of the rear lift mechanism 40 are mated with given portions of the seat cushion 2 and tightly bolted to the same. It is to be noted that this bolt fastening is easily achieved because the seat cushion 2 has been connected but loosely to the front lift mechanism 20. Finally, the bolts of the front lift mechanism 20 are tightly fastened.

When, for the purpose of adjusting the height of the front portion of the seat cushion 2, the handling knob 33b is turned in a given direction, the pivot shaft 32 is turned about its axis, and thus the elongate member 36 connected through the pivotally connected brackets 34a and 34b and arm members 35a and 35b to the pivot shaft 32 is raised or lowered. With this, the front portion of the seat cushion 2 is raised or lowered to a desired new position. It is to be noted that the biasing spring incorporated with the pivot shaft 32 promotes the turning of the same in the direction to raise the elongate member 36. Once the front portion of the seat cushion 2 is brought to the desired position, the handling knob 33b is released from an operator's hand. Under this condition, because of function of the break lock mechanism, the elongate member 36 does not move any longer even when the seat cushion 2 is applied with an external force by, for example, a seat occupant.

The height adjusting of the rear portion of the seat cushion 2 is effected by the rear lift mechanism 40 in substantially the same manner as the above-mentioned front lift mechanism 30.

That is, when the handling knob 43b is turned, the pivot shaft 42 is turned and thus the arm members 46a and 46b are raised or lowered. Thus, the rear portion of the seat cushion 2 is raised or lowered to a desired new position. Due to the function of the biasing spring, the raising movement of the seat cushion 2 is promoted. Once the handling knob 43b is released from an operator's hand, the newly set height position of the seat cushion 2 is kept unmovably due to function of the brake lock mechanism mounted in the knob 43b.

What is claimed is:

1. A seat lifter comprising:
   spaced side base members; and
   front and rear lift mechanism which are mounted on front and rear portions of said side base members for adjusting the heights of front and rear portions of a seat cushion, respectively.
   wherein each lift mechanism comprises a pivot shaft extending across said side base members, brackets secured to said pivot shaft to rotate therewith, arm members pivotally connected to said brackets and connected to said seat cushion so that rotation of said pivot shaft induces pivotal movements of said brackets about the pivot shaft thereby selectively lifting and lowering said seat cushion; a sector gear pivotally held by one of said side base members and pivotally moved together with said pivot shaft, a pinion meshed with said sector gear, and a handling knob mounted on one of said side base members and having said pinion connected thereto.

2. A seat lifter as claimed in claim 1, in which said front lift mechanism further comprises an elongate member which extends between the arm members and is pivotally connected to the same, said elongate member being secured to said seat cushion.

3. A seat lifter as claimed in claim 2, in which said sector gear of the front lift mechanism is secured to said pivot shaft to rotate therewith.

4. A seat lifter as claimed in claim 3, in which said sector gear of the second lift mechanism is pivotally connected through a link to one of the brackets of the second lift mechanism.

5. A seat lifter as claimed in claim 4, in which said elongate member of the first lift mechanism is formed with bolt openings through which bolts for connecting said elongate member to said seat cushion pass.

6. A seat lifter as claimed in claim 5, in which said arm members of said second lift mechanism are formed with respective bolt openings through which bolts for connecting said arm members to said seat cushion pass.

7. A seat lifter as claimed in claim 6, further comprising a biasing means which biases each pivot shaft to rotate about its axis.

8. A seat lifter as claimed in claim 7, further comprising a brake lock mechanism which is installed in each handling knob to achieve only one-way power transmission from said handling knob to said pinion.

9. A seat lifter comprising:
spaced side base members; and
front and rear lift mechanisms which are mounted on front and rear portions of said side base members for adjusting the heights of front and rear portions of a seat cushion, respectively,
wherein each lift mechanism comprises a pivot shaft extending across said side base members, brackets secured to said pivot shaft to rotate therewith, arm members pivotally connected to said brackets and connected to said seat cushion, a sector gear pivotally connected to one of the side base members and pivotally moved together with said pivot shaft, a pinion meshed with the sector gear, and a handling knob mounted on one of said side base members and having said pinion connected thereto, wherein said front lift mechanism further comprises an elongate member which extends between the arm members and is pivotally connected to the same, said elongate member being secured to said seat cushion.

10. A seat lifter as claimed in claim 9, in which said sector gear of the front lift mechanism is secured to said pivot shaft to rotate therewith.

11. A seat lifter as claimed in claim 10, in which said sector gear of the second lift mechanism is pivotally connected through a link to one of the brackets of the second lift mechanism.

12. A seat lifter as claimed in claim 11, in which said elongate member of the first lift mechanism is formed with bolt openings through which bolts for connecting said elongate member to said seat cushion pass.

13. A seat lifter as claimed in claim 12, in which said arm members of said second lift mechanism are formed with respective bolt openings through which bolts for connecting said arm members to said seat cushion pass.

14. A seat lifter as claimed in claim 13, further comprising a biasing means which biases each pivot shaft to rotate about its axis.

15. A seat lifter as claimed in claim 14, further comprising a brake lock mechanism which is installed in each handling knob to achieve only one-way power transmission from said handling knob to said pinion.

* * * * *